(12) United States Patent
Li

(10) Patent No.: US 11,914,798 B2
(45) Date of Patent: *Feb. 27, 2024

(54) COUNT PER INCH CALIBRATION METHOD AND OPTICAL NAVIGATION DEVICE

(71) Applicant: PixArt Imaging Inc., Hsin-Chu (TW)

(72) Inventor: Jr-Yi Li, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,835

(22) Filed: Feb. 14, 2023

(65) Prior Publication Data

US 2023/0185388 A1  Jun. 15, 2023

Related U.S. Application Data

(63) Continuation of application No. 17/385,943, filed on Jul. 27, 2021, now Pat. No. 11,609,646.

(60) Provisional application No. 63/160,937, filed on Mar. 15, 2021.

(51) Int. Cl.
*G06F 3/0354* (2013.01)
*G06F 3/03* (2006.01)
*G06F 3/038* (2013.01)

(52) U.S. Cl.
CPC ........ *G06F 3/03543* (2013.01); *G06F 3/0317* (2013.01); *G06F 3/0383* (2013.01)

(58) Field of Classification Search
CPC ... G06F 3/03543; G06F 3/0317; G06F 3/0383
See application file for complete search history.

(56) References Cited

U.S. PATENT DOCUMENTS

| | | | |
|---|---|---|---|
| 2017/0371433 A1* | 12/2017 | Pai ................... | G06F 3/0383 |
| 2018/0024221 A1* | 1/2018 | Lim .................. | G01S 3/786 |
| | | | 702/104 |
| 2018/0267626 A1* | 9/2018 | Wang ................. | G06F 3/0383 |

* cited by examiner

*Primary Examiner* — Jonathan A Boyd
(74) *Attorney, Agent, or Firm* — Winston Hsu

(57) ABSTRACT

An optical navigation device, comprising: an optical sensor, configured to sense optical data; and a processing circuit, configured to compute motions of the optical navigation device based on the optical data, and configured to output the motions, wherein a first CPI is set to the processing circuit. The processing circuit receives a calibration command to calibrate the first CPI to a second CPI, wherein the second CPI is computed via following steps: (a) computing a real CPI corresponding to times of motions output by the processing circuit during a time interval that a relative displacement between the optical navigation device and a surface reaches a first predetermined distance; (b) computing a ratio between the real CPI and the first CPI or a difference between the real CPI and the first CPI; and (c) generating the second CPI based on the ratio or the difference.

10 Claims, 7 Drawing Sheets

COUNT PER INCH CALIBRATION METHOD AND OPTICAL NAVIGATION DEVICE

CROSS REFERENCE TO RELATED APPLICATIONS

This application is a continuation application of U.S. application Ser. No. 17/385,943, filed on Jul. 27, 2021, which claims the benefit of U.S. Provisional Application No. 63/160,937, filed on Mar. 15, 2021. The contents of these applications are incorporated herein by reference.

BACKGROUND OF THE INVENTION

1. Field of the Invention

The present invention relates to a CPI (Counter Per Inch) calibration method and an optical navigation device, and particularly relates to a CPI calibration method and an optical navigation device which can calibrate CPI based on a calibration ruler pattern.

2. Description of the Prior Art

A CPI is an important parameter for a conventional optical mouse, since CPI means a frequency that the optical mouse outputs motions thereof to a host such as a computer. If the CPI is too low, the user may feel the optical mouse does not move smoothly. On the opposite, if the CPI is too high, the user may feel the optical mouse moves too fast. Therefore, it is necessary to set a proper CPI to the optical mouse.

Due to the assembling process, component manufacturing process or the firmware installed to the optical mouse, the real CPI and the CPI set to the optical mouse may be different. However, conventional CPI calibration methods do not provide a recommended CPI or need complicated equipment's.

Therefore, a new CPI calibration mechanism is needed.

SUMMARY OF THE INVENTION

One objective of the present invention is to provide an optical navigation device which can calibrate CPI via simple steps.

Another objective of the present invention is to provide a CPI calibration method which can calibrate CPI via simple steps.

One embodiment of the present invention discloses an optical navigation device, comprising: an optical sensor, configured to sense optical data; and a processing circuit, configured to compute motions of the optical navigation device based on the optical data, and configured to output the motions, wherein a first CPI is set to the processing circuit. The processing circuit receives a calibration command to calibrate the first CPI to a second CPI, wherein the second CPI is computed via following steps: (a) computing a real CPI corresponding to times of motions output by the processing circuit during a time interval that a relative displacement between the optical navigation device and a surface reaches a first predetermined distance; (b) computing a ratio between the real CPI and the first CPI or a difference between the real CPI and the first CPI; and (c) generating the second CPI based on the ratio or the difference.

Another embodiment of the present invention discloses: a CPI calibration method, configured to calibrate a CPI of an optical navigation device comprising an optical sensor and a processing circuit. The CPI calibration method comprising: (a) sensing optical data via the optical sensor; (b) applying the processing circuit to compute motions of the optical navigation device based on the optical data by the optical sensor, and applying the processing circuit to output the motions, wherein a first CPI is set to the processing circuit; (c) computing a real CPI corresponding to times of motions output by the processing circuit during a time interval that a relative displacement between the optical navigation device and a surface reaches a first predetermined distance; (d) computing a ratio between the real CPI and the first CPI or a difference between the real CPI and the first CPI; (e) generating a second CPI based on the ratio or the difference; and (f) calibrating the first CPI to the second CPI.

In view of above-mentioned embodiments, the CPI of an optical navigation device can be calibrated via simple steps.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
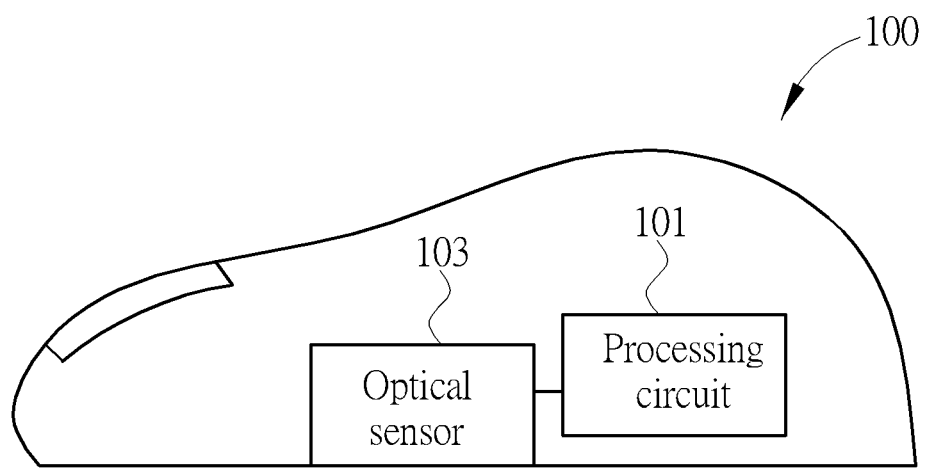
FIG. 1 is a schematic diagram illustrating an optical mouse according to one embodiment of the present invention.

FIG. 1 is a schematic diagram illustrating an optical mouse 100 according to one embodiment of the present invention. Please note, in following embodiments, an optical mouse is used as an example for explaining the concepts of the present invention. However, the optical mouse can be replaced by any other optical navigation device.

As illustrated in FIG. 1, the optical mouse 100 comprises a processing circuit 101 and an optical sensor 103. The optical sensor 103 is configured to sense optical data. The optical data can be images, or any other optical data comprising optical feature. The processing circuit 101 is configured to compute motions of the optical mouse 100 based on the optical data, and configured to output the motion. For example, the optical mouse 100 is connected to a computer and outputs the motions thereof to the computer. A first CPI is set to the processing circuit 101. That is, the processing circuit 101 is supposed to output motions at the first CPI. Please note, although the embodiments of the present invention depicts that the motions are output by the processing circuit 101, it does not limit that the motions are output by the processing circuit 101. The motions can be output by any other device coupled to the processing circuit 101. Besides, other data besides the motions can also be output by the processing circuit 101. Therefore, in one embodiment, the processing circuit 101 is supposed to output data, which is motion or not motion, at the first CPI. In following embodiments, only the motion is used as an example for explaining.

However, the real CPI of the processing circuit 101 may be different from the first CPI, due to various reasons. Therefore, the processing circuit 101 can receive a calibration command to calibrate the first CPI to a second CPI, thereby the optical mouse 100 can really output motions at the first CPI. The second CPI can be acquired by various methods. In one embodiment, the second CPI is acquired after a relative displacement between the optical navigation device 100 and a surface reaches a first predetermined distance.

Figure 2:
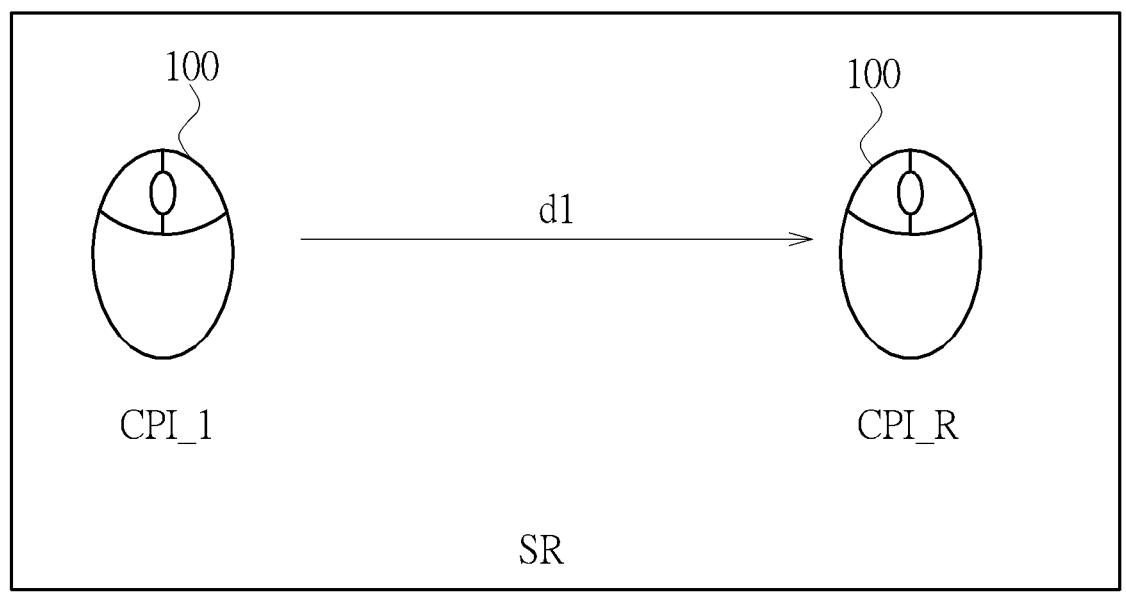
FIG. 2 is a schematic diagram illustrating a CPI calibration method according to one embodiment of the present invention.

FIG. 2 is a schematic diagram illustrating a CPI calibration method according to one embodiment of the present invention. In the embodiment shown in FIG. 2, the processing circuit 101 is supposed to operate at the first CPI CPI_1. Then, a real CPI CPI_R corresponding to times of motions output by the processing circuit 101 during a time interval that a relative displacement between the optical navigation device 100 and a surface Sr reaches a first predetermined distance dl is computed. Please note, the relative displacement may occur when the optical mouse 100 moves but the surface Sr stops, or occurs when the optical mouse 100 stops but the surface Sr moves.

Next, a ratio between the real CPI CPI_R and the first CPI CPI_1 or a difference between the real CPI CPI_R and the first CPI CPI_1 is computed. After that, the second CPI is generated based on the ratio or the difference.

For example, if the first CPI CPI_1 is 8000 and the real CPI CPI_R is 6000, the ratio between the first CPI CPI_1 and the real CPI CPI_R is 8000/6000=1.3334. That is, the ratio between the CPI set to the processing circuit 101 and the real CPI is 1.3334 Therefore, if the processing circuit 101 is desired to operate at the real CPI 8000, the CPI set to the optical mouse 100 can be 8000*1.3334=10667. That is, the CPI set to the processing circuit 101 is changed from 8000 (the first CPI CPI_1) to 10667 (the second CPI CPI_2).

Figure 3:
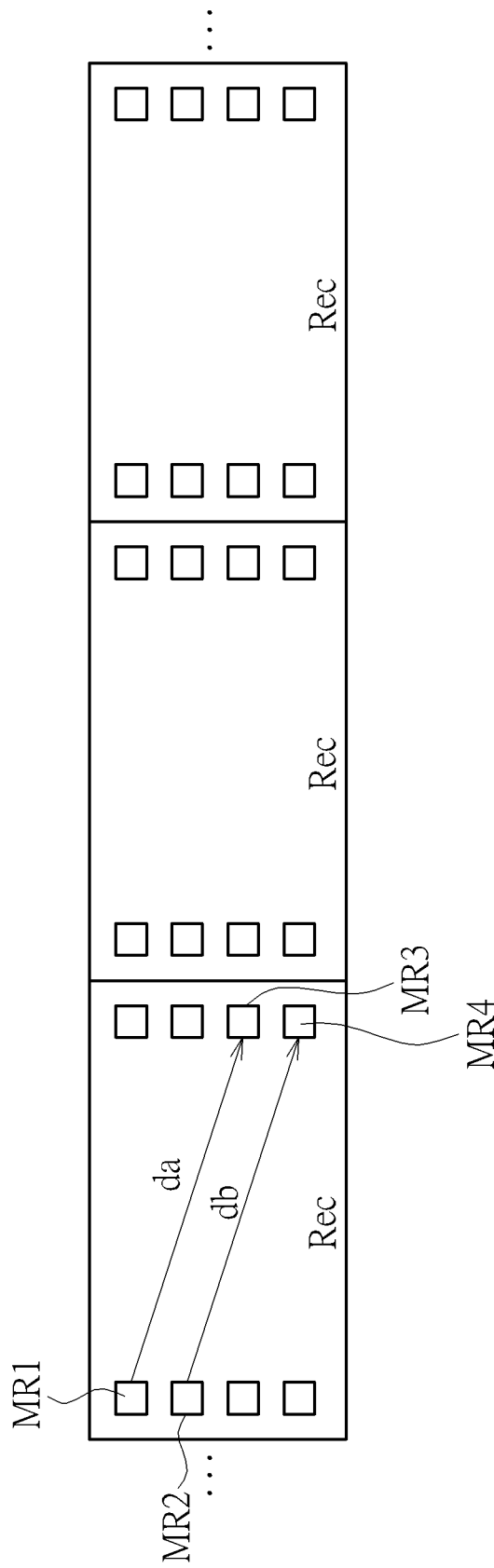
FIG. 3 is a schematic diagram illustrating a calibration ruler pattern, according to one embodiment of the present invention.

Many methods can be applied to determine whether the relative displacement between the optical navigation device 100 and the surface Sr reaches the first predetermined distance or not. In one embodiment, a calibration ruler pattern is provided as the surface Sr for such determination. FIG. 3 is a schematic diagram illustrating a calibration ruler pattern, according to one embodiment of the present invention. As illustrated in FIG. 3, the calibration ruler pattern 300 comprises a plurality of rectangles Rec. Also, each of the rectangles Rec has a plurality of mark regions MR1-MR4 (only four of them are marked). For more detail, the rectangles Rec are repeatedly arranged and each of the rectangles Rec comprises identical numbers of the mark regions, for example, 8 mark regions.

In such case, the processing circuit 101 determines if the relative displacement reaches the first predetermined distance according to whether the optical sensor 103 senses the mark regions. For more detail, the rectangle Rec has a first side (e.g., the left side), and a second side (e.g., the right side) opposite to the first side, the processing circuit 101 determines if the relative displacement reaches the first predetermined distance according to whether the optical sensor senses the mark regions on the first side and the mark regions on the second side at different time. For example, if the optical sensor 103 senses the mark region MR1 first and then senses the mark region MR3, the processing circuit 101 determines that a relative displacement da (the first predetermined distance) exists between the optical mouse 100 and the calibration ruler pattern 300. Similarly, if the optical sensor 103 senses the mark region MR2 first and then senses the mark region MR4, the processing circuit 101 determines that a relative displacement db (the first predetermined distance) exists between the optical mouse 100 and the calibration ruler pattern 300.

The mark regions can have various contents. In one embodiment, the mark regions respectively have a specific pattern. For example, the mark region MR1 has a circle shape and the mark region MR3 has a triangle shape. In such example, the processing circuit 101 determines if the relative displacement reaches the first predetermined distance according to whether the optical sensor 103 senses the specific patterns. For example, if the optical sensor 103 senses the circle shape first and then senses the triangle shape, the processing circuit 101 determines that a relative displacement da exists between the optical mouse 100 and the calibration ruler pattern 300.

In another embodiment, the mark regions respectively have a gray level distribution. For example, if the whole gray level distribution of the rectangle Rec is from 0% to 100%, the mark region MR1 has a gray level distribution between 0% to 5%, the mark region MR2 has a gray level distribution between 5% to 22%, the mark region MR3 has a gray level distribution between 73% to 90%, and the mark region MR4 has a gray level distribution between 90% to 100%. In such example, the processing circuit 101 determines if the relative displacement reaches the first predetermined distance according to whether the optical sensor 103 senses gray level variations caused by the gray level distributions of different mark regions. In one embodiment, the calibration ruler pattern 300 can be coded such that a series of digital codes can be used to indicate the gray level distributions.

The following Table 1 is an example illustrating digital codes indicating the gray level variations between different mark regions.

TABLE 1

|     | MR1    | MR2    | MR3    | MR4    |
| --- | ------ | ------ | ------ | ------ |
| MR1 |        | 000110 | 001100 | 010010 |
| MR2 | 000000 |        | 001101 | 010011 |
| MR3 | 000001 | 000111 |        | 010100 |
| MR4 | 000010 | 001000 | 001110 |        |

For example, if the processing circuit 101 detects that the gray level variation which is represented by digital codes 010010 occurs, it means the optical mouse from the mark region MR1 to the mark region MR 4. Also, if the processing circuit 101 detects than the gray level variation which is represented by digital codes 001101 occurs, it means the optical mouse from the mark region MR2 to the mark region MR3. Please note, the digital codes indicating the gray level variations may be different when different algorithms are used.

The calibration ruler pattern 300 can be provided in different ways. In one embodiment, the calibration ruler pattern 300 is provided on a paper. In such case, the optical mouse 100 can move on the paper for CPI calibration, but the paper does not move. In another embodiment, the calibration ruler pattern 300 is displayed on a display. The display can be, for example, a touch screen or an epaper. In such case, the optical mouse 100 can move on the display for CPI calibration, but the display and the calibration ruler pattern 300 do not move. On the contrary, the optical mouse 100 can stop on the display for CPI calibration, and only the calibration ruler pattern 300 moves.

Figure 4:
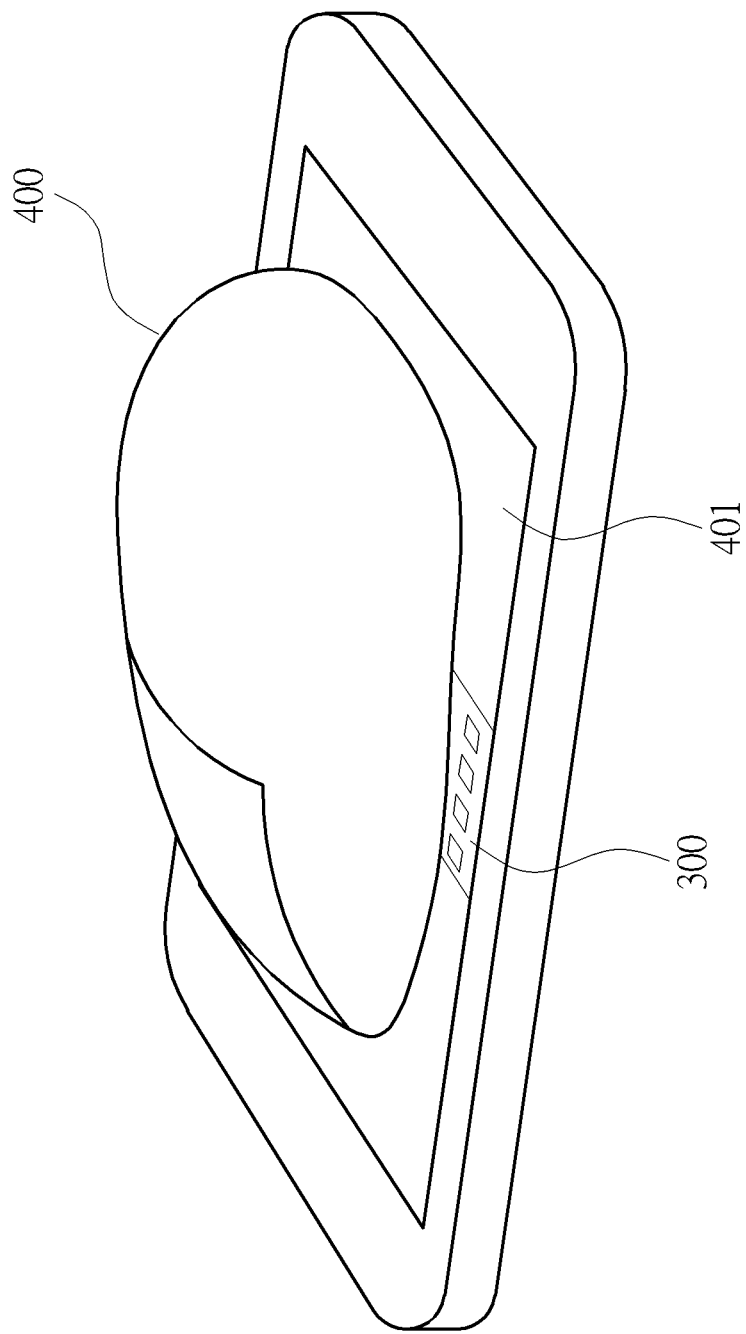
FIG. 4 is a schematic diagram illustrating how to calibrate a CPI of the optical mouse when the calibration ruler pattern is displayed on a display.

FIG. 4 is a schematic diagram illustrating how to calibrate a CPI of the optical mouse when the calibration ruler pattern 300 is displayed on a display. As illustrated in FIG. 4, the calibration ruler pattern 300 can be displayed on the display 401 of the mobile phone 400, and the optical mouse 100 is put on the display 401. In such case, the optical mouse 100 does not move while calibrating CPI. On the contrary, a user can scroll the calibration ruler pattern 300 to cause relative displacements between the optical mouse 100 and the calibration ruler pattern 300.

Figure 5:
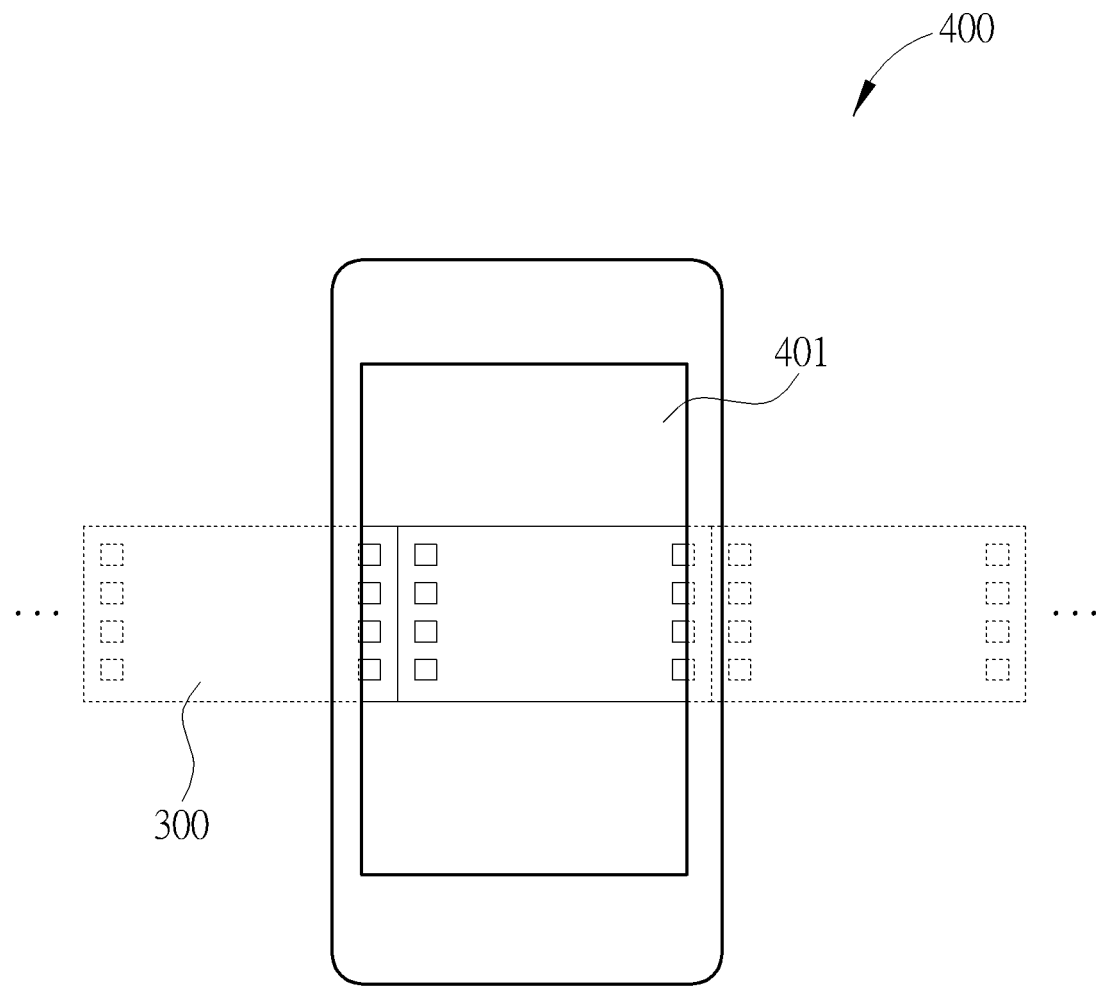
FIG. 5, FIG. 6 and FIG. 7 are schematic diagrams illustrating that the calibration ruler pattern is displayed on the display, according to different embodiments of the present invention.
Figure 6:
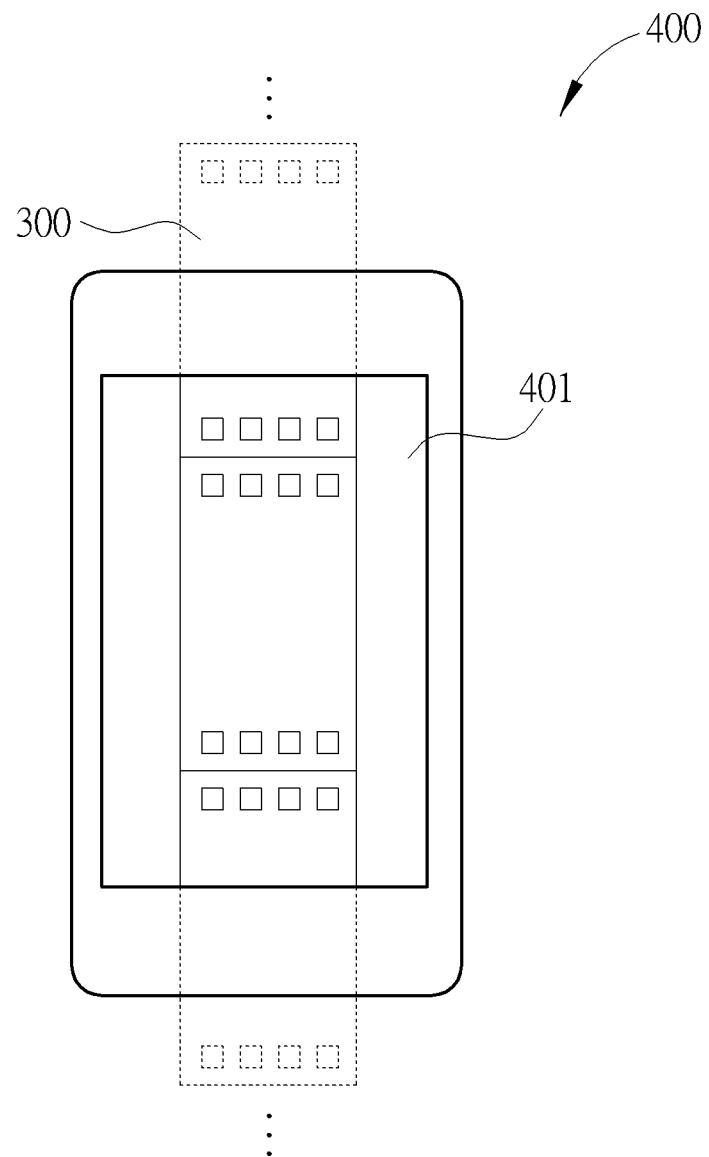
Figure 7:
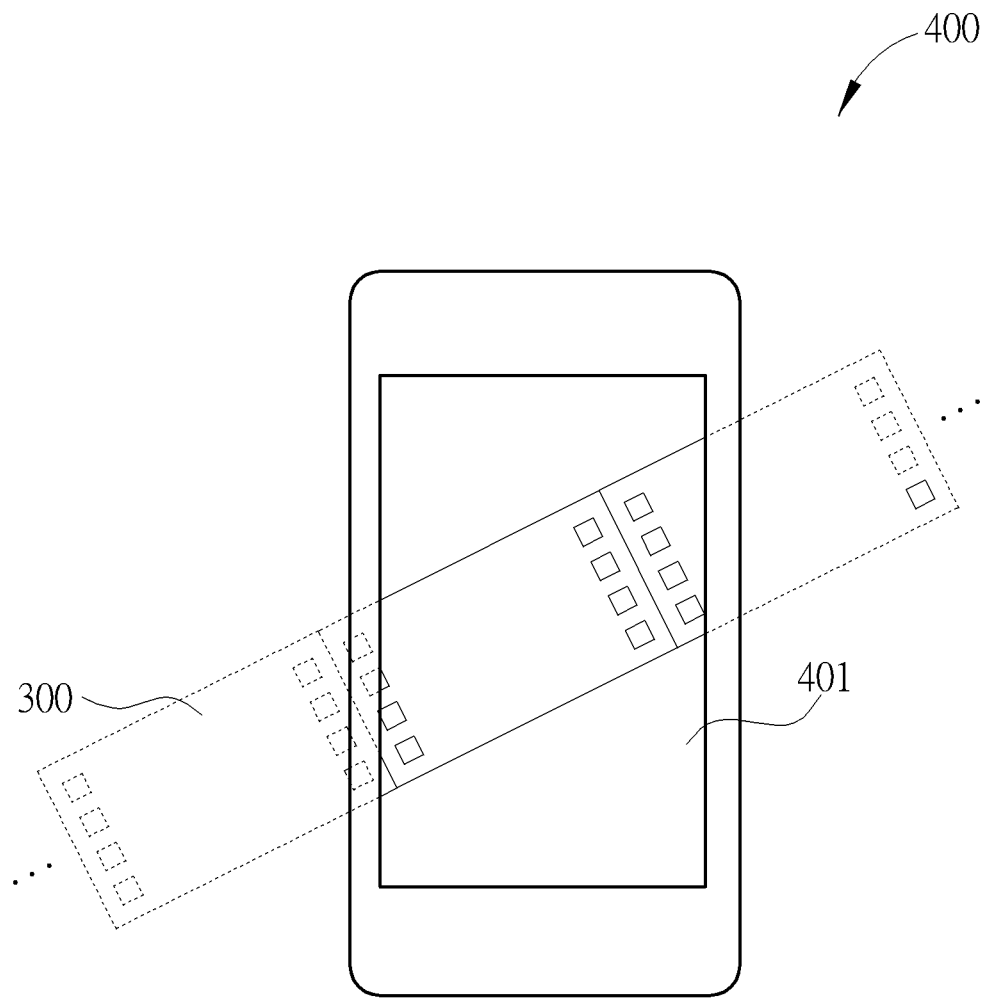

The calibration ruler pattern 300 can be displayed on the display 401 in different directions. FIG. 5, FIG. 6 and FIG. 7 are schematic diagrams illustrating how the calibration ruler pattern is displayed on the display, according to different embodiments of the present invention. In the embodiment of FIG. 5, the mobile phone 400 is in a portrait mode, and the calibration ruler pattern 300 is displayed in parallel with an upper edge and a lower edge of the display 401. Also, in the embodiment of FIG. 6, the mobile phone 400 is in a portrait mode, and the calibration ruler pattern 300 is displayed perpendicular with an upper edge and a lower edge of the display 401. Additionally, in the embodiment of FIG. 7, the mobile phone 400 is in a portrait mode, and the calibration ruler pattern 300 is displayed neither perpendicular with nor parallel with an upper edge and a lower edge of the display 401. The display of the calibration ruler pattern 300 can follow rules shown in FIG. 5, FIG. 6 and FIG. 7 when the mobile phone 400 operates in a landscape mode.

The above-mentioned CPI calibration methods can be performed in various scenarios. For example, the CPI can be calibrated for the optical mouse after the manufacturing of the optical mouse in the factory. Also, the CPI can be calibrated when the user is playing a game. Further, the CPI calibration method can be triggered by various methods. For example, the CPI calibration method can be triggered by a button on the optical mouse, or triggered by an icon shown on a user interface displayed by a display controlled by a host which the optical mouse is connected.

Figure 8:
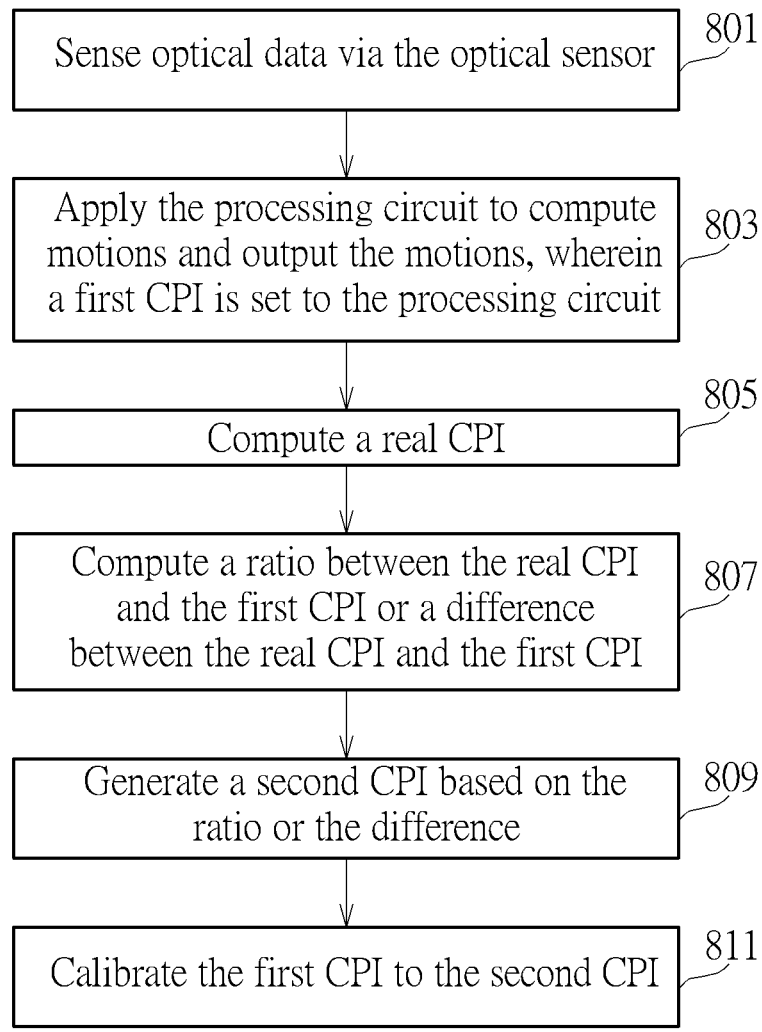
FIG. 8 is a flow chart illustrating a CPI calibration method, according to one embodiment of the present invention.

Based on above-mentioned embodiments, a CPI calibration method can be acquired, which is for calibrating a CPI of an optical navigation device comprising an optical sensor and a processing circuit, such as the optical mouse illustrated in FIG. 1. FIG. 8 is a flow chart illustrating a CPI calibration method, according to one embodiment of the present invention, which comprises following steps:

Step 801

Sense optical data via the optical sensor.

Step 803

Apply the processing circuit to compute motions of the optical navigation device based on the optical data by the optical sensor, and apply the processing circuit to output the motions, wherein a first CPI is set to the processing circuit. That is, the processing circuit is supposed to operate at the first CPI.

Step 805

Compute a real CPI corresponding to times of motions output by the processing circuit during a time interval that a relative displacement between the optical navigation device and a surface reaches a first predetermined distance. Such step can be implemented via a calibration ruler pattern, as shown in FIG. 3.

Step 807

Compute a ratio between the real CPI and the first CPI or a difference between the real CPI and the first CPI.

Step 809

Generate a second CPI based on the ratio or the difference.

Step 811

Calibrate the first CPI to the second CPI.

In view of above-mentioned embodiments, the CPI of an optical navigation device can be calibrated via simple steps.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
   an optical sensor, configured to sense optical data; and
   a processing circuit, configured to compute motions of the optical navigation device based on the optical data, and configured to output the motions, wherein a first CPI is set to the processing circuit;
   wherein the processing circuit receives a calibration command to calibrate the first CPI to a second CPI, wherein the second CPI is computed via following steps:
   (a) computing a real CPI corresponding to times of motions output by the processing circuit during a time interval that a relative displacement between the optical navigation device and a surface reaches a first predetermined distance;
   (b) computing a ratio between the real CPI and the first CPI or a difference between the real CPI and the first CPI; and
   (c) generating the second CPI based on the ratio or the difference;
   wherein the step (a) further comprises:
   providing a calibration ruler pattern, wherein the calibration ruler comprises a plurality of mark regions;
   determining the relative displacement according to the mark regions.

2. The optical navigation device of claim 1, wherein the optical navigation device is an optical mouse.

3. The optical navigation device of claim 2, the optical navigation device is connected to a computer.

4. The optical navigation device of claim 1, wherein the steps (a), (b) and (c) are triggered by a button on the optical navigation device.

5. The optical navigation device of claim 1, wherein the steps (a), (b) and (c) are triggered by an icon shown on a user interface displayed by a display, wherein the display is controlled by a host which the optical navigation device is connected.

6. A CPI calibration method, configured to calibrate a CPI of an optical navigation device comprising an optical sensor and a processing circuit, the CPI calibration method comprising:

(a) sensing optical data via the optical sensor;
(b) applying the processing circuit to compute motions of the optical navigation device based on the optical data by the optical sensor, and applying the processing circuit to output the motions, wherein a first CPI is set to the processing circuit;
(c) computing a real CPI corresponding to times of motions output by the processing circuit during a time interval that a relative displacement between the optical navigation device and a surface reaches a first predetermined distance;
(d) computing a ratio between the real CPI and the first CPI or a difference between the real CPI and the first CPI;
(e) generating a second CPI based on the ratio or the difference; and
(f) calibrating the first CPI to the second CPI;
wherein the step (c) further comprises:

providing a calibration ruler pattern, wherein the calibration ruler comprises a plurality of mark regions;
determining the relative displacement according to the mark regions.

7. The CPI calibration method of claim 6, wherein the optical navigation device is an optical mouse.

8. The CPI calibration method of claim 7, the optical navigation device is connected to a computer.

9. The CPI calibration method of claim 6, wherein the steps (a), (b) and (c) are triggered by a button on the optical navigation device.

10. The CPI calibration method of claim 6, wherein the steps (a), (b) and (c) are triggered by an icon shown on a user interface displayed by a display, wherein the display is controlled by a host which the optical navigation device is connected.

* * * * *